(12) United States Patent
Russo et al.

(10) Patent No.: US 6,503,576 B1
(45) Date of Patent: Jan. 7, 2003

(54) SUPERALLOY HVOF POWDERS WITH IMPROVED HIGH TEMPERATURE OXIDATION, CORROSION AND CREEP RESISTANCE

(75) Inventors: Lysa Russo, Hauppauge, NY (US); Mitchell R. Dorfman, Smithtown, NY (US); Kerry LaPierre, Troy, MI (US)

(73) Assignee: Sulzer Metco (US) Inc., Westbury, NY (US)

( * ) Notice: Subject to any disclaimer, the term of this patent is extended or adjusted under 35 U.S.C. 154(b) by 0 days.

(21) Appl. No.: 09/972,176

(22) Filed: Oct. 5, 2001

Related U.S. Application Data

(63) Continuation of application No. 09/535,178, filed on Mar. 27, 2000, now Pat. No. 6,346,134.

(51) Int. Cl.[7] .................................................. C23C 4/06
(52) U.S. Cl. ........................................ 427/453; 427/456
(58) Field of Search ................................. 427/453, 456

(56) References Cited

U.S. PATENT DOCUMENTS

| | | | | |
|---|---|---|---|---|
| 4,124,737 A | | 11/1978 | Wolfla et al. ................ 428/640 |
| 4,275,090 A | * | 6/1981 | McComas et al. .......... 427/451 |
| 4,275,124 A | * | 6/1981 | McComas et al. .......... 427/450 |
| 4,300,947 A | * | 11/1981 | Habesch et al. .............. 241/16 |
| 4,339,509 A | * | 7/1982 | Dardi et al. ................. 428/632 |
| 4,451,496 A | * | 5/1984 | Gedwill et al. .............. 427/405 |
| 4,585,481 A | * | 4/1986 | Gupta et al. .............. 106/14.05 |
| 4,615,865 A | * | 10/1986 | Duvall et al. ................ 420/443 |
| 4,933,239 A | * | 6/1990 | Olson et al. ................... 419/30 |
| 5,277,936 A | * | 1/1994 | Olson et al. ................. 427/201 |
| 5,455,119 A | | 10/1995 | Taylor et al. ................ 428/632 |

OTHER PUBLICATIONS

J. Quets et al., "The High Temperature Impact–Sliding Wear and Oxidation Resistance of Several Cobalt–Based Oxide–Containing Detonation Gun Coatings", *Thin Solid Films.* 84, 1981, pp. 107–118.

J. Haynes et al., "Thermal Cycling Behavior of Plasma–Sprayed Thermal Barrier Coatings with Various MCrAlX Bond Coats", *Journal of Thermal Spray Technology,* vol. 9(1), Mar. 2000, pp. 38–47.

Russo et al., "High Temperature Oxidation of McrAlY Coatings Produced by HVOF", *Proceedings of Thermal Spraying (ITSC '95),* May 1995, pp. 1179–1184.

* cited by examiner

*Primary Examiner*—Ngoclan Mai
(74) *Attorney, Agent, or Firm*—Mitchell S. Faller, Esq.; Ira J. Schaefer, Esq.; Clifford Chance, LLP

(57) ABSTRACT

A high velocity oxygen fuel thermal spray powder comprising a superalloy having the formula MCrAlY—X, wherein M is at least one metal taken from the group consisting of nickel, cobalt, and iron; X is at least one reactive element taken from the group consisting of hafnium, rhenium, lanthanum, and tantalum; and yttrium is present in levels greater than 1% by weight of the total composition and up to about 6% by weight of the total composition. In addition, the powder may be blended with an agglomeration of M'CrAlY and a ceramic, wherein M' is at least one metal taken from the group consisting of nickel, cobalt, and iron. The invention offers improved high temperature oxidation, corrosion and creep resistance.

15 Claims, No Drawings

SUPERALLOY HVOF POWDERS WITH IMPROVED HIGH TEMPERATURE OXIDATION, CORROSION AND CREEP RESISTANCE

This application is a continuation application of application Ser. No. 09/535,178 filed Mar. 27, 2000 and now U.S. Pat. No. 6,346,134.

FIELD OF THE INVENTION

This invention relates to two new families of high velocity oxygen fuel (HVOF) thermal spray superalloy (MCrAlY—X) alloy powders.

BACKGROUND OF THE INVENTION

Current MCrAlY compositions have been mostly designed to be used as cast metals for high temperature (850–1100° C.) applications on components such as blades and vanes on aircraft and land-based turbines. MCrAlY alloys are commonly used at these elevated temperatures due to their ability to form an oxide scale, either alumina or chromia based, which acts as a protective barrier against high temperature oxidation and corrosion environments. The adherence and stabilization of this scale is directly related to the useful life of the alloy. Scales that have poor integrity and "flake-off" cause the continual outward diffusion of key elements in order to replace the exposed area with new oxide scale. This process eventually depletes the alloy of its critical elements thereby reducing its high temperature effectiveness.

Accordingly, the main object of the invention is to provide HVOF powders that offer improved high temperature oxidation, corrosion and/or creep resistance.

SUMMARY OF THE INVENTION

The foregoing and other objects of the present invention are achieved, at least in part, by utilizing gas atomized MCrAlY—X alloy compositions consisting of a metal, M, of nickel, cobalt and/or iron, chromium with levels between 20–35 wt %, aluminum with levels between 5–15 wt %, yttrium with levels greater than 1 wt % and up to about 6 wt % and a reactive element, X, which can be hafnium, rhenium, lanthanum and/or tantalum with levels between 2–10 wt %.

The compositions are unique in that they are designed to be used as overlay coatings and deposited via the HVOF process. The chemistries of these alloys have been especially tailored to compensate for the relatively low temperature, oxygen-rich environment of the HVOF combustion flame.

The addition of a reactive element to an MCrAlY composition has been found to enhance the adhesion of the protective oxide scale, increase the plasticity of the scale, grade the mechanical differences between the ceramic oxide scale and the metallic base alloy, and modify the scale growth mechanisms by controlling the diffusion process.

The role of yttrium in the composition is to help adhere the protective oxide scale to the coating structure below. However, it has been found that traditional yttrium levels (1 wt % or less) are insufficient when deposited with the HVOF process. This insufficiency is due to the oxide formation of the yttrium forming various phases of yttria, which are less beneficial to the oxide adhesion process. In order to compensate for this occurrence, the present invention includes a new family of MCrAlY compositions that contain a higher level of yttrium (greater than 1 wt % and up to about 6 wt %, preferably 1.5 wt % to 5.5 wt %, and most preferably about 4 wt %) in the powder. This increased yttrium level in conjunction with the addition of a reactive element, produce an overlay that is better able to withstand high temperature oxidation and corrosion environments by improving the formation and adherence of the protective oxide scale.

For optimal performance, MCrAlY coatings must be sprayed with a "cool" HVOF flame in order to minimize the formation of internal oxides. This limited heat content of the flame also minimizes the effectiveness of depositing high melting point materials like ceramics. It has been found that by surrounding the ceramic particles with lower melting point metallic alloys, a higher degree of ceramic can be entrapped within the coating. These discrete ceramic particulates within the coating help to restrict grain growth within the alloy at high temperatures. This restriction in turn improves the material's creep resistance.

Thus, in a first family of powders in accordance with the present invention, a MCrAlY—X composition is specifically designed for the HVOF deposition process. The yttrium content has been increased to greater than 1 wt % and up to about 6 wt % to compensate for the oxidation that occurs during deposition. The reactive element component, X, is incorporated to improve the formation and adhesion of the protective oxide scale. This improved adhesion leads to increased oxidation and corrosion protection offered by the overlay.

The present invention also includes a second family of HVOF MCrAlY—X materials, which is a blend of (1) MCrAlY—X, and (2) MCrAlY and ceramic, that have been designed to offer superior creep resistance over traditional alloy compositions. This class of alloys contains an agglomerated (spray dried) secondary component consisting of MCrAlY+ceramic (i.e., alumina, yttria, garnet, etc.). Thus, in addition to the advantages of the improved oxide scale properties from the MCrAlY—X component, this class takes advantage of the improved creep resistance provided from the addition of an agglomerated ceramic component. The agglomerated secondary component is present in the blend in levels of 30–50% by weight of the total composition. The overall amount of ceramic in the bulk powder ranges from 3–15% by weight, preferably 4.5–7.5 wt %. In a preferred embodiment, an agglomerated powder with 15 wt % $Al_2O_3$ and 85% CoNiCrAlY is blended with MCrAlY—X powders. Again, this class of materials is unique in that the addition of a secondary component, which is an agglomeration of a ceramic and a metal, takes advantage of the HVOF flame characteristics.

Following are examples of three novel MCrAlY powders in accordance with the present invention disclosed herein:

|  | AE 7855 | AE 7856 | AE 7857 |
|---|---|---|---|
|  |  | wt % |  |
| Chemical Analysis |  |  |  |
| Al | 11 | 12 | 11 |
| B | 0.29 | — | — |
| C | 0.02 | 0.01 | 0.01 |
| Co | 19 | 36.3 | 22 |
| Cr | 28 | 21 | 20 |
| Ni | 29 | 25 | 37 |
| Re | 3 | 2 | — |
| Si | 0.03 | — | — |
| Ta | 5 | — | 5 |
| Y | 4 | 4 | 4 |

-continued

|  | AE 7855 | AE 7856 wt % | AE 7857 |
|---|---|---|---|
| Total All Others | <0.3 | <0.4 | <0.2 |
| $O_2$ | 0.03 | 0.03 | 0.03 |
| $N_2$ | 0.00 | 0.00 | 0.00 |
| Particle Size, microns |  |  |  |
| −15 μm | 5 | 2 | 2 |
| Sieve Analysis |  |  |  |
| +270 Mesh | 0 | 0 | 0 |
| +325 Mesh | 4 | 5 | 5 |
| −325 +15 μm | 91 | 93 | 94 |

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A method of applying a thermal barrier coating to an object comprising the steps of:
    (a) providing a thermal spray powder composition comprising a superalloy having the formula M—Cr—Al—Y—X, wherein M is at least one metal taken from the group consisting of nickel, cobalt, and iron; X is at least one reactive element; and yttrium is present in levels from about 4% by weight of the total composition to about 6% by weight of the total composition; and
    (b) applying the powder to the object using high velocity oxygen fuel spraying.

2. The method of claim 1, wherein chromium is present in levels of 20–35% by weight of the total thermal spray powder composition.

3. The method of claim 2, wherein aluminum is present in levels of 5–15% by weight of the total thermal spray powder composition.

4. The method of claim 1, wherein said at least one reactive element is taken from the group consisting of hafnium, rhenium, lanthanum, and tantalum.

5. The method of claim 4, wherein said at least one reactive element is present in levels of 2–10% by weight of the total thermal spray powder composition.

6. The method of claim 1, wherein said at least one reactive element is present in levels of 2–10% by weight of the total thermal spray powder composition.

7. The method of claim 1, wherein yttrium is present in levels of about 4% by weight of the total thermal spray powder composition.

8. A method of applying a thermal barrier coating to an object comprising the steps of:
    (a) providing a thermal spray powder composition comprising
        (i) a first superalloy having the formula M—Cr—Al—Y—X, wherein M is at least one metal taken from the group consisting of nickel, cobalt, and iron; X is at least one reactive element; and yttrium is present in levels greater than 1% by weight of the first superalloy to about 6% by weight of the first superalloy, and
        (ii) an agglomeration of a second superalloy having the formula M'—Cr—Al—Y, and a ceramic, wherein M' is at least one metal taken from the group consisting of nickel, cobalt and iron; and
    (b) applying the powder to the object using high velocity oxygen fuel spraying.

9. The method in claim 8, wherein said ceramic is taken from the group consisting of alumina, yttria, and garnet.

10. The method in claim 8, wherein said ceramic is present in a level of 15% by weight of the agglomeration.

11. The method in claim 8, wherein said ceramic is present in levels of 3–15% by weight of the thermal spray powder composition.

12. The method in claim 8, wherein said ceramic is present in levels of 4.5–7.5% by weight of the total thermal spray powder composition.

13. The method in claim 8, wherein said agglomeration is present in levels of 30–50% by weight of the total thermal spray powder composition.

14. The method in claim 8, wherein the yttrium of the first superalloy is present in levels from about 1.5% by weight of the first superalloy to about 5.5% by weight of the first superalloy.

15. The method in claim 8, wherein the yttrium of the first superalloy is present in levels of about 4% by weight of the first superalloy.

* * * * *